United States Patent [19]

Holte

[11] 4,095,871
[45] Jun. 20, 1978

[54] PORTABLE ELECTRIC CURRENT SUPPLY DEVICE FOR BUILDING SITES AND THE LIKE

[76] Inventor: Hans Holte, N-3810 Gvarv i Telemark, Norway

[21] Appl. No.: 758,445

[22] Filed: Jan. 11, 1977

[30] Foreign Application Priority Data

Jan. 14, 1976 Norway .................................. 760123

[51] Int. Cl.² ...................... B65H 75/40; H01R 13/60
[52] U.S. Cl. ................................ 339/119 C; 191/12.4; 242/85.1
[58] Field of Search ............... 339/119 R, 119 C, 120, 339/5 RL, 6 RL, 8 RL; 242/85.1; 174/58, 135; 191/12.4

[56] References Cited

U.S. PATENT DOCUMENTS

| 1,127,017 | 2/1915 | Kidder et al. | 242/85.1 X |
| 2,204,939 | 6/1940 | Lyons | 242/85.1 X |
| 2,561,556 | 7/1951 | Bell | 191/12.4 X |
| 3,213,185 | 10/1965 | Petrick | 174/58 |
| 3,290,453 | 12/1966 | Jensen | 339/119 R X |

Primary Examiner—Roy Lake
Assistant Examiner—E. F. Desmond
Attorney, Agent, or Firm—Holman & Stern

[57] ABSTRACT

A portable electric current supply device for building sites and the like. The device is constituted by a housing which in its interior holds current distribution equipment, other electric equipment and/or instruments. All the elements held by the housing are connected to a common supply cable. The housing takes the form of a round or polygonal pipe made of solid but resilient material, such as hard plastic. At each end the housing extends into pairs of opposite flaps which serve as bumpers and side boundaries for a coil of the supply cable. Between pairs of oppositely directed flaps the tubular housing is provided with openings serving both access openings to the equipment inside the housing and as carrying means. The flaps are tapered off towards their ends and the edges of the pairs of opposite flaps merge with each other along concavely curved transition portions which constitute bottom points for a coil of the supply cable.

9 Claims, 3 Drawing Figures

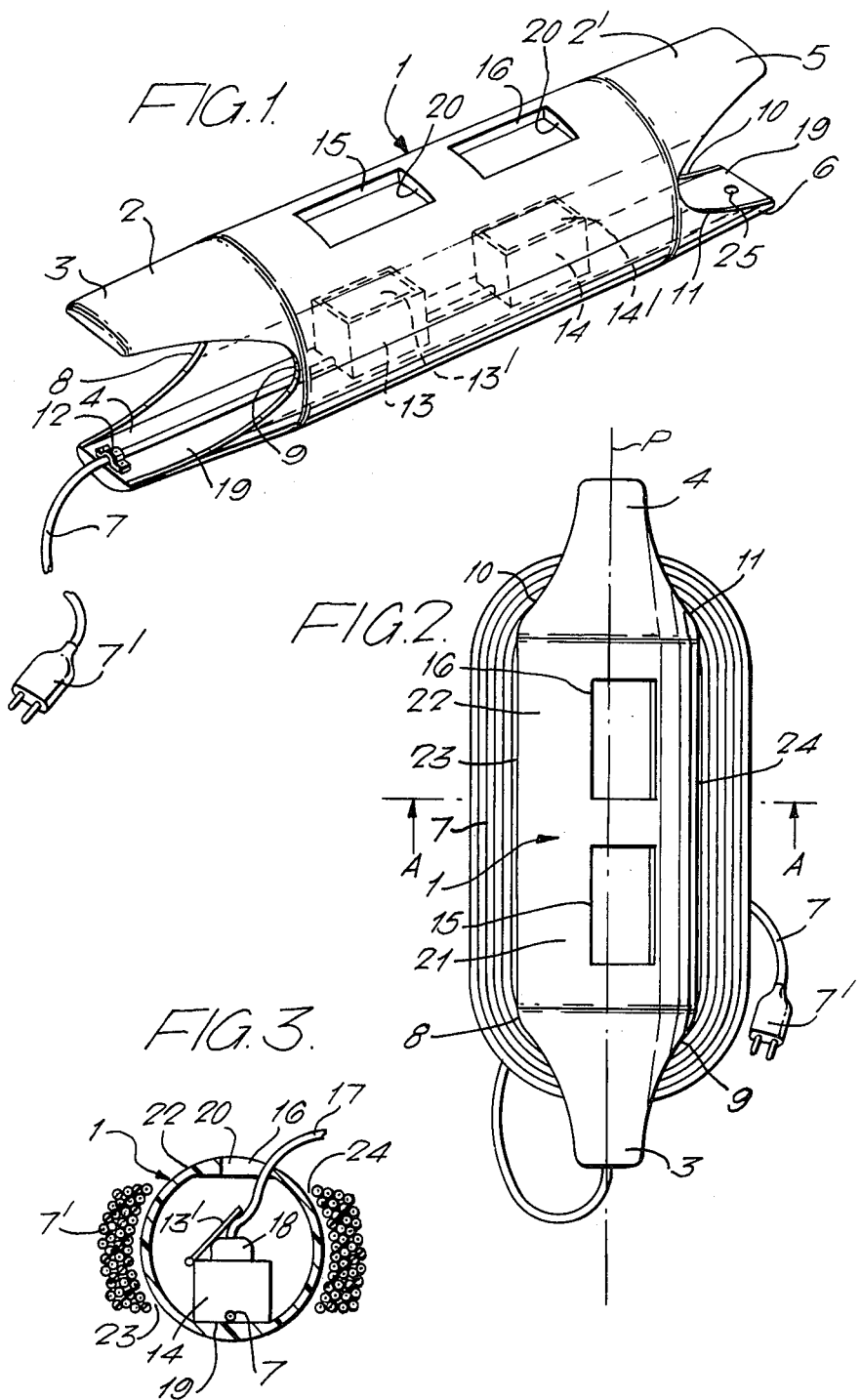

PORTABLE ELECTRIC CURRENT SUPPLY DEVICE FOR BUILDING SITES AND THE LIKE

BACKGROUND OF THE INVENTION

The present invention relates to a portable electric current supply device for building sites and the like, consisting of a housing which in its interior holds current distribution equipment, other electric equipment and/or instruments, all connected to a common supply cable, and which is provided with means for carrying the device.

On building sites, in workshops, in the field and the like where portable electrical equipment for illumination, electric measuring apparatus and mechanical operations are required, it is often difficult to arrange the current supply in such a manner that cables, switches, splicing means and outlet contacts neither constitute an obstacle nor are subjected to damage by traffic, precipitation etc. Often one has to do with surplus cable lengths, and to keep the site as tidy as possible, one usually winds such cable lengths onto drum-shaped cable winches. However, such winches are bulky and heavy and, besides, there also exists a limit as to how large lengths it is possible to wind onto such winches before the heat generation from the closely arranged windings give rise to too high temperatures.

In winches provided with lateral current outlets, these outlets will rotate with the winch when cable is wound onto or off from it, and when the outlets of the cable winch are in use, it will be difficult to adjust the unwound cable lengths since the supply cables of the connected apparatus will be twisted together.

In the publicly acsessible Norwegian patent application No. 4583/73 there is disclosed a movable electrical current supply device which solves the above mentioned problems. For the device according to that application the main body thereof, i.e. the housing, is open at both ends to facilitate both the mounting of the equipment held by the housing and the access thereto. The housing is on the outside provided with horns onto which the supply cable may be wound without covering the current distribution equipment. By giving the horns a suitable form, they may serve as a carrying means. If desired, the carrying means may be constituted by a separate handle suitably provided at the top or the side of the device.

SUMMARY OF THE INVENTION

The present invention may be said to be a further development of the invention according to the above mentioned Norwegian patent application, and provides a device which in addition to maintaining most of the favourable features of the device of the said application is still more simple and economical to manufacture, a favourable shape of the housing making it unnecessary to provide the device with horns for the winding of the cable, the shape of the housing giving the equipment held thereby a better protection in case it is subjected to shocks and impacts.

The main characterizing feature of the device according to the invention consists in that the housing takes the form of a pipe of solid, somewhat resilient material which at each end has extensions forming two opposite flaps serving as bumpers and as side boundaries for a coil of the supply cable, and that the carrying means is constituted by one or more openings which are provided in the pipe wall substantially in the area between two oppositely directed flaps and also serve as access openings to the equipment in the interior of the housing.

The pipe-shaped housing renders a good protection for the equipment, which is mounted on the inner wall of the housing and thus located inside the contour thereof. If the device should fall down on a solid base, the resilient material of the housing will attenuate the impact, and especially the opposite flaps will render an excellent shock absorbing effect.

In giving the flaps a shape tapering towards the ends and in letting the edges of opposite flaps merge with each other along concavely rounded transition portions which constitute bottom points of the coil, it is possible both to achieve an improved shock absorbing effect and to facilitate winding and unwinding of the cable.

The open ends of the device and the provision of openings in the walls thereof facilitate the mounting of the current distribution equipment in the housing. Preferably, the housing may in the area of the flaps and in the longitudinally extending areas which connect oppositely directed flaps, be provided with thicker walls so as to form approximately flat internal mounting portions. The flat mounting portions make the mounting of a larger number of distribution equipment still easier, the screws or similar attachment means for attaching the equipment in the housing being given a more safe anchoring.

To achieve good gripping facilities when the device is held by the user during transport winding or unwinding, the openings may be arranged in offset positions relative to the central plane of the flaps. Thereby there is achieved a larger gripping surface on one side of the openings, and the grip of the hand may be placed closer to the central plane of the flaps. This arrangement of the openings facilitate the winding operation since the coil is then not obstructed by the hand and the arm of the user.

The current supply device according to the invention also affords the advantage that the cable may be loaded with the maximum permissible current intensity even at approximately fully wound cable, since the wound cable has a good ventilation. This is primarily due to the fact that the cable, when wound, will form rounded or approximately elliptic turns, so that a space is left between the housing and the cable. Also at the ends of the housing the wound cable will have good ventilation due to the open configuration thereof.

In the following description the invention will be explained in more detail, reference being had to the drawings, which illustrate a preferred embodiment of the device according to the invention.

BRIEF DESCRIPTION OF THE DRAWINGS

FIG. 1 is a perspective view of the device with unwound supply cable.

FIG. 2 is a top view of the device with wound supply cable.

FIG. 3 is a section taken along the line A—A in FIG. 2.

DETAILED DESCRIPTION OF THE PREFERRED EMBODIMENTS

In the embodiment shown the portable electric current distribution device according to the invention comprises a housing 1 manufactured from a solid, but somewhat resilient material, e.g. a relatively hard plastic. The housing 1 may be formed from a piece of extruded piping which by suitable machining is given the desired form, or it may be manufactured by casting. In the embodiment shown in the drawings an approximately round outer pipe shape has been chosen, as it most clearly appears from FIG. 3, although the housing 1, of course, may as an alternative have a polygonal outer surface.

At each of the ends 2 and 2', the housing 1 is provided with two opposite flaps 3, 4 and 5, 6, respectively, which serve as bumpers and as lateral boundaries for a coil of supply cable 7 with a plug 7'. The flaps 3, 4 and 5, 6 taper slightly towards the ends, and the edges of opposite flaps 3, 4 and 5, 6, respectively, merge with each other in approximately semi-circular concave transition portions 8, 9 and 10, 11, respectively. The tapered form of the flaps affords an improved shock absorbing effect, and together with the concave transition portions 8, 9 and 10, 11 they give the end result in a shape of the extremities of the housing 1 which facilitate the winding of the supply cable 7, the transition portions constituting bottom points for the winding.

Through a clamping means 12 provided on one of the flaps 4, the supply cable 7 extends up to sockets 13, 14 to which it is connected for the supply of current. The sockets 13, 14 which for example may be of spray protected design with spring loaded covers 13' and 14', respectively, are mounted within the housing 1 and therefore well protected inside the circumference thereof. In the area above each of the sockets 13, 14 the wall of the housing is provided with openings 15, 16, through which an extention cord or an apparatus cord 17 (FIG. 3) with plug 18 may be connected to the sockets 13, 14. The open ends of the housing 1 and the provision of openings 15, 16 in the wall thereof, facilitate the mounting of the sockets 13, 14 or other distribution equipment or apparatus in the housing as well as possibly renewal or repair thereof if this should be necessary. It is advantagous that the openings 15, 16 have a size which renders an unobstructed access for the tools which have to be used during mounting and dismantle, care also being taken to facilitate the access to the distribution equipment or the instruments for the connection, replacement or reading operations associated therewith.

In the areas of the flaps and in the longitudinally extending areas which connect oppositely directed flaps 3, 5 and 4, 6 respectively, the housing 1 is provided with thicker walls than the rest of the housing. The increased wall thickness is implemented so as to provide an approximately flat mounting portion 19 which facilitates the mounting of the sockets 13, 14 when these are provided with flat bottoms. In the areas of the openings 15, 16 the increased wall thickness, as indicated at 20, will to a certain degree compensate for the reduction of the breaking strength of the housing caused by said openings.

As is best seen in FIGS. 2 and 3, the access openings 15 and 16 are somewhat offset with respect to the central-plane P of the flaps 3, 4. On one side of the openings 15, 16 larger surface portions 21, 22 are then achieved between the wound cable 7 and the openings themselves. This renders a larger gripping surface for the user and facilitates lifting and holding of the housing 1 during transport or during winding or unwinding of the cable. Also the increased wall thickness at 20 contributes in achieving a good grip on the housing 1.

As indicated in FIG. 2 and 3 the wound supply cable 7 will take the form of rounded or approximately elliptic turns around the central-portions of the housing, so as to leave spaces 23, 24 between the wall of the housing and the cable 7. These spaces provide free passage of air at the central-portions of the housing, and since the housing is open at the ends 2 and 2', the air currents will also here be able to pass freely through the turns of the cable 7. Due to this good aeration it is possible, even with approximately fully wound cable 7, to load the same with maximum permissible current intensity.

In one or more of the flaps, for example as indicated in the flap 6, there may be provided a hole 25 serving for the hanging of the device on a suitable knob or hook on the site.

If the device is to be used outdoors and in rainy weather, the housing may be placed with the access openings turned downwards, so as to avoid that water will penetrate into the housing and cause demage to the equipment therein.

Of course, the invention may be reduced to practice in other ways than the one described above. As mentioned, the housing may be shaped not only with a round and smooth outer surface, but also with a polygonal outer surface, for example with four, six or any other number of sides. Further, the device or housing may be manufactured from an extruded pipe having an even wall thickness, or having opposite portions with increased wall thickness. After the extrusion, the pipe is severed and cut to the desired shape with opposite pairs of flaps at each end as well as with one or more access and grip openings. If the housing is manufactured by moulding, further machining thereof may be avoided.

The number and the location of the elements to be mounted inside the housing may be varied. For example, only one socket may be provided in the housing and only one access opening is then required.

It is to be understood that also the open portions at the ends of the housing may be used as access openings to the distribution equipment located in the housing. It is true that most of the supply cable must then be unwound in order to expose for example a current supply outlet for lamp conduits and technical conduits, but after the connection is made thereto, the surplus of supply cable may, of course, be wound onto the housing to give the most tidy site possible. The above mentioned access opening(s) will then primarily serve as carrying means, but may still also serve as access to any other distribution equipment in the housing.

The device according to the invention which may be regarded as a combination of a cable winch and protecting housing for electrical equipment, can be manufactured very economically whether it is made from only one blank or more. The round shape of the housing together with the protruding end flaps make the device very insensitive to shocks, as the device both rolls and is resilient. The openings give together with the open pipe-shape of the housing unobstructed access to the equipment.

The device according to the invention is easy to grip, it has a low weight and renders good cooling for the wound cable. In use the surplus of cable lengths may be wound onto the device without obstructing the access to the interior of the housing. By locating the access openings downwards, it is possible to use the device in spray-crown fields and outdoors in rainy weather and till be prevented from water penitrating into the housing.

As mentioned above the tube-shaped housing may be made not only of a single blank, but of two or more pieces. If the housing is made of two pieces, these may take the form of pipe-halves which, when put together, constitute a pipe-shaped housing as described above. The two pieces may then be affixed to each other by mechanical fastening means, the assembly of said pieces following the mounting of the equipment to be held by the finished housing.

What I claim is:

1. Portable electric current supply device for building sites and the like, consisting of a housing which in its interior holds current distribution equipment, other electrical equipment and/or instruments, all connected to a common supply cable, and which is provided with means for carrying the device, characterized in that the housing takes the form of the pipe of solid, somewhat resilient material which at each end has extentions forming two opposite flaps serving as bumpers and as side boundaries for a coil of the supply cable, and that the carrying means is constituted by one or more openings which are provided in the pipe wall substantially in the area between two oppositely directed flaps and also serve as access openings to the equipment in the interior of the housing.

2. Device as stated in claim 1, characterized in that the housing (1) has a round cross section profile.

3. Device as stated in claim 1, characterized in that the housing (1) has a polygonal cross section profile.

4. Device as stated in claim 1, characterized in that the housing in the area of the flaps and in the longitudinally extending areas which connect oppositely directed flaps is provided with thicker walls forming approximately flat internal mounting portions.

5. Device as stated in claim 1, characterized in that the openings are offset relative to the central-plane of the flaps to render an increased gripping surface serving for the carrying of the device and the holding thereof during winding operations.

6. Device as stated in claim 1, characterized in that the flaps taper off towards the ends, and that the edges of opposite flaps merge with each other along concavely curved transition portions which constitute bottom points for the cable coil.

7. Device as claimed in claim 1, characterized that the tube-shaped housing is made of one piece.

8. Device as stated in claim 1, characterized in that the tube-shaped housing is made of two or more pieces.

9. Device as stated in claim 8, characterized in that the pieces are affixed to each other by mechanical fastening means, the assembly of said pieces following the mounting of the equipment to be held by the finished housing.

* * * * *